United States Patent [19]

Beerens

[11] 4,412,463
[45] Nov. 1, 1983

[54] CHAIN SAW SHARPENING GUIDE

[76] Inventor: Cornelis J. M. Beerens, 40-42 Berkshire Rd., NSunshine, Vic., Australia

[21] Appl. No.: 285,080
[22] PCT Filed: Nov. 20, 1980
[86] PCT No.: PCT/AU80/00093
§ 371 Date: Jul. 14, 1981
§ 102(e) Date: Jul. 14, 1981
[87] PCT Pub. No.: WO81/01379
PCT Pub. Date: May 28, 1981

[30] Foreign Application Priority Data
Nov. 23, 1979 [AU] Australia .............. PE1462

[51] Int. Cl.³ ............................................. B23D 63/10
[52] U.S. Cl. ....................................... 76/36; 76/25 A; 33/202
[58] Field of Search ............... 76/36, 25 A, 25 R, 31; 33/202

[56] References Cited
U.S. PATENT DOCUMENTS

| 2,038,628 | 4/1936 | Barr . | |
| 2,171,169 | 8/1939 | Woodbury | 76/36 |
| 2,662,423 | 12/1953 | Greenlee | 76/36 |
| 3,071,987 | 1/1963 | Kopare | 76/36 |
| 3,322,000 | 5/1967 | Newman | 76/36 |
| 3,670,600 | 6/1972 | Arff | 76/36 |
| 3,905,118 | 9/1975 | Ballen | 76/25 A |
| 4,023,445 | 5/1977 | Silvon | 76/36 |
| 4,131,038 | 12/1978 | Beerens | 76/25 A |
| 4,277,987 | 7/1981 | Hyde | 76/25 A |

FOREIGN PATENT DOCUMENTS
160234 12/1954 Australia .

Primary Examiner—Roscoe V. Parker
Attorney, Agent, or Firm—Wigman & Cohen

[57] ABSTRACT

A chain saw sharpening guide manually held in position on the saw chain comprising a support plate (11) carrying grooved rollers (13, 13a) mounted on brackets (12, 12a) depending from the plate (11). The rollers (13, 13a) are grooved (15, 15a) to receive the saw sharpening file (34) in rolling contact and maintain it parallel to the plate. In use the guide is located on the saw chain with the rollers straddling the chain with the file in contact with the saw tooth and with the rollers. A slot (16) in the plate (11) allows the operator to view the sharpening action. Variations provide graduations and stops for correct angle of cut and undercut of cutting edge plus adjustment of the saw tooth depth gauge.

7 Claims, 8 Drawing Figures

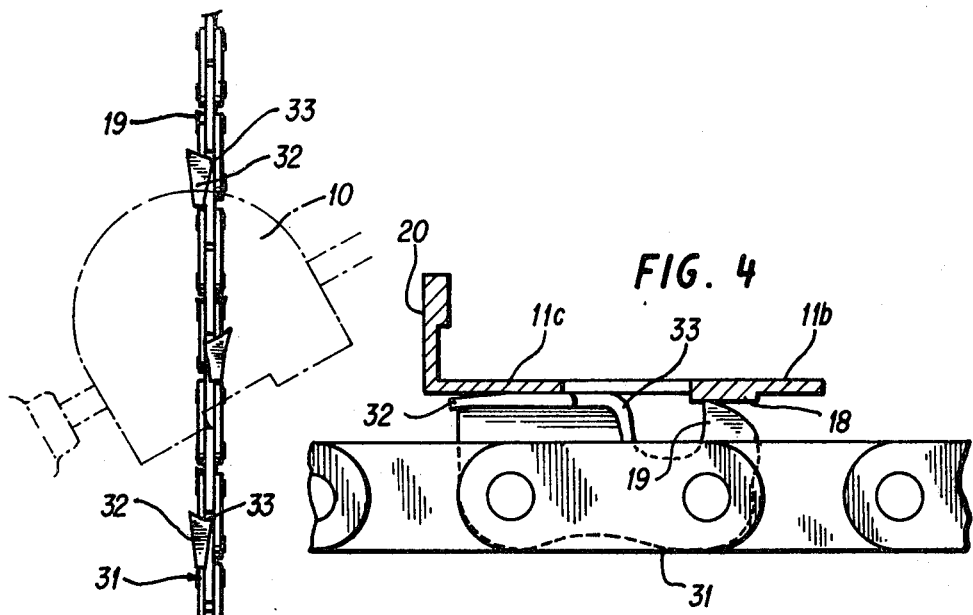
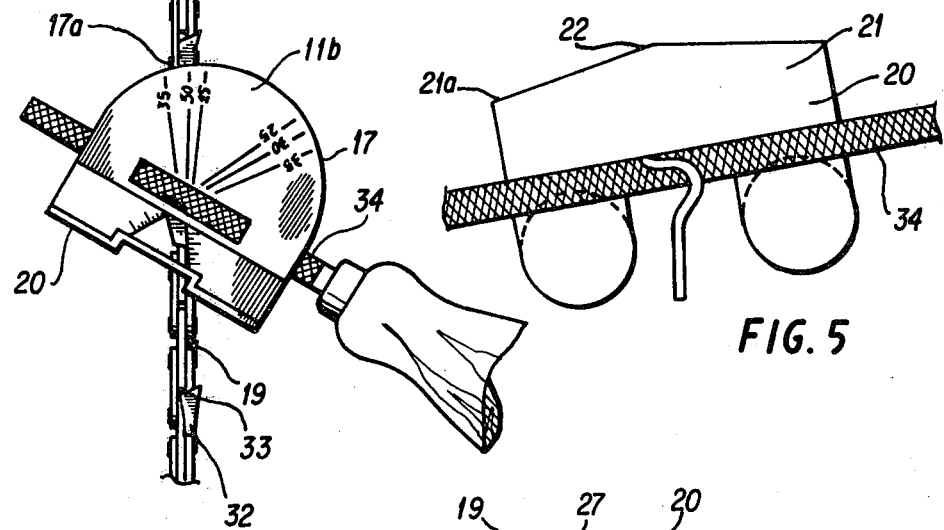
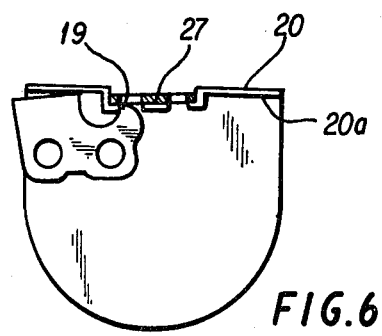
FIG. 3
FIG. 4
FIG. 5
FIG. 6

CHAIN SAW SHARPENING GUIDE

This invention relates to a saw sharpening guide particularly for use in the sharpening of chain saws, however, is also applicable to sharpening of conventional saws, including hand saws.

The two basic requirements of a saw sharpening guide are that the file used in conjunction therewith is at the required angle to the plane of the tooth being sharpened and at the correct depth in relationship to the tip of the tooth.

Many guides have been proposed for this purpose, a number of which are constructed to be clamped or otherwise attached to the saw in order to guide the file in the correct relationship to the tooth. Although many of these guides are quite effective, the need to affix them to the saw blade increases the time required for sharpening each tooth. Other forms of guides are attached to the file and incorporate a sight line to guide the operator in maintaining the file at the correct angle to the plane of the saw. These devices have the disadvantage that the sight line moves with the file, and accordingly it is difficult for the operator to properly observe the relationship between the sight ine and the blade throughout the sharpening operation. Other guide devices are known wherein the file operates against a stationary member, and thus if the member is hardened the file wears, and if the member is not hardened it will wear rapidly.

It is therefore the object of the present invention to provide a saw sharpening guide which is simple and accurate in operation, and does not have the above referred to disadvantages of the known guides.

With this object in view there is provided a saw sharpening guide comprising a support adapted to be positioned in a straddling relation to a saw blade, a pair of rollers mounted on the support for rotation about respective parallel axes, said roller axes having a fixed relative disposition so the rollers lie on opposite sides of the blade when the support occupies said straddling position, a continuous peripheral groove in each roller, said grooves being disposed in a common plane and shaped so that a file seated in both grooves may be reciprocated while in rolling contact with both rollers, the support being selectively positionable on the blade in said straddling relation so the line of reciprocation of the file is inclined to the blade at predetermined opposite angles, said support being adapted to co-operate with the saw teeth to determine the depth position of the rollers.

Conveniently the support is also adapted so that it may be tilted in the direction transverse to the blade to provide an undercut on the sharpened edge of the tooth.

In one of the preferred forms of the guide, sight lines are provided on the support which may be selectively disposed parallel to the blade by manual manipulation of the support. With the sight line in this parallel relationship, the line of the reciprocation of the file is at a predetermined angle to the blade being sharpened. The sight lines are provided in pairs as each alternate tooth must be sharpened with the line of reciprocation of the file at an equal and opposite angle to the blade. More than one pair of sight lines may be provided to accommodate different angles of sharpening to suit various types of saws. The sight line may merely be marked on a surface of the support or may be formed by edges of the support or edges of an aperture provided in the support.

Generally the support member comprises two parallel sections with the rollers located therebetween and supported on stationary pins secured to and extending between the parallel sections. At least one of the parallel sections is provided with a flange extending generally at right angles thereto which is intended in use to rest upon the tip of the saw tooth to be sharpened. The height of this right angle flange relative to the axis of the rollers is set so that when the right angle portion rests on the tip of the tooth, a file located in the grooves of the roller is in the correct relationship to the tooth to effect sharpening thereof by reciprocation of the file. Alternatively an adjustable height member may be provided to co-operate with the teeth or depth finger of the saw.

The same right angle portion and/or a right angle portion provided on the other parallel section is provided with a pair of sight lines inclined at an equal and opposite angle to a plane parallel to the axes of the rollers and centrally therebetween. The inclination of the sight lines to the central plane corresponds to the required cutting angle of the tooth to be sharpened. Accordingly, when the support is positioned so that the sight line is parallel to the blade of the saw, the file will be at the correct sharpening angle to the tooth. In one form, the sight line is embossed or engraved onto the surface of the support and in an alternative the sight lines are adjacent edges of a V-shaped notch in the support member. The V-shaped notch may have graduations along the length of said adjacent edges so that when the guide is used for sharpening a chain saw, each tooth may be sharpened so that the same length of tooth remains. To achieve this, the operator continues sharpening of the tooth until the back edge of each tooth aligns with the same graduation. In yet a further alternative the sight line may be an edge of the right angles portion of the support member.

In a further form of the guide, slots may be provided in the parallel sections so that when the support is fitted to the blade with the blade located in the respective slots the line of reciprocation of the file when seated on the rollers is at the required angle to the tooth. The slots are arranged so that the support may be fitted to the blade in the two required opposite inclinations for sharpening alternate teeth.

The present invention will be more readily understood from the following description of two alternative practical arrangements of the saw sharpening guide for use on a chain saw as illustrated in the accompanying drawings. The saw sharpening guides illustrated are only examples of the many various forms that the guide may take.

In the drawings

FIG. 3 is a plan view of a section of a chain saw with the saw sharpening guide shown in FIGS. 1 and 2 operatively positioned thereon.

FIG. 4 is a view in the direction A in FIG. 3 of the guide positioned on the chain saw.

FIG. 5 is a diagrammatic view taken transversely of the chain saw with the guide positioned to sharpen the saw teeth with undercut.

FIG. 6 is a diagrammatic view showing how the guide may be used to correct the height of the depth gauge portion of a chain saw tooth.

Figure 1:
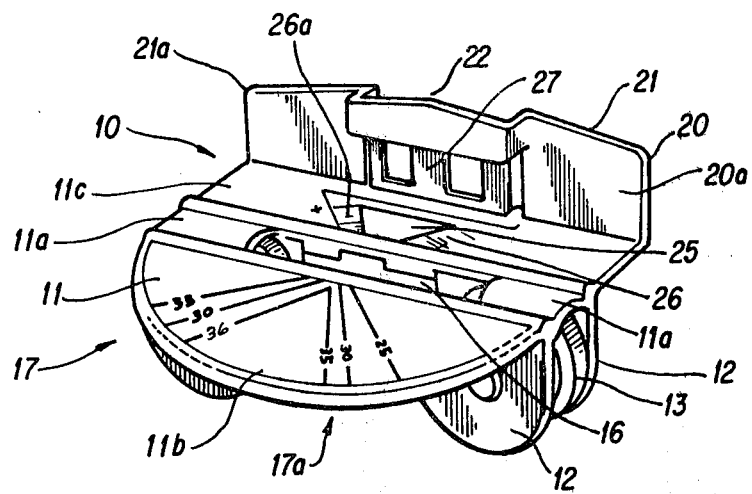
FIG. 1 is a perspective view from above, of a first arrangement of the saw sharpening guide.
Figure 2:
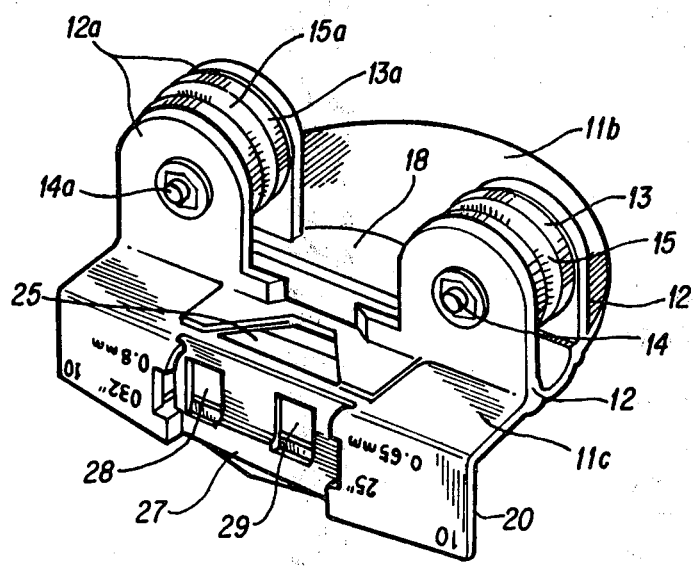
FIG. 2 is a perspective view from beneath, of the saw sharpening guide shown in FIG. 1.

Referring now to FIGS. 1 and 2 of the drawings, the saw sharpening guide comprises a support member 10 in the form of a one piece plastic moulding made of a suitable material so that the support is substantially rigid. The support 10 comprises a generally flat main plate 11 with two pairs of dependent mounting lugs 12 and 12a on the underside thereof. Respective rollers 13 and 13a are disposed between the lugs forming each pair and are rotatably supported by respective shafts 14 and 14a extending between and carried by the lugs forming the respective pairs. The axes of the shafts 14 and 14a and hence of the rollers 13 and 13a are parallel to one another and parallel to the plane of the main plate 11. Each roller 13 and 13a has a continuous peripheral groove 15 and 15a. The grooves being of substantially arcuate cross-section and being disposed in a common plane normal to the axes of the rollers and to the plane of the main plate 11.

The main plate 11 has an elongated opening 16 located generally in the area of the main plate between the respective pairs of mounting lugs 12 and 12a. This opening permits the operator to observe a file located between the underside of the main plate 11 and the rollers 13 and 13a and seated in the peripheral groove 15 and 15a formed in the respective rollers. The portions 11a of the main plate located at either end of the slot 16 form with the respective rollers immediately therebelow two aligned passages through which the file extends and is held captive whilst it is being operated seated in the peripheral grooves of the rollers. There is an excess of clearance between the file and the portion 11a so that there is not contact therebetween whilst the file is being operated. However, by having the file held captive in the passages, the file and the saw sharpening guide will remain in assembly during the selective re-positioning of the guide on the saw as hereinafter described.

On the semi-circular end portion 11b of the main plate 11 there are provided two series 17 and 17a of radial sight lines. In the embodiment shown there are three sight lines in each series, with the respective sight lines of each series being inclined at an angle of 25°, 30° and 35° respectively to a plane disposed parallel to and centrally between the axes of the two rollers 13 and 13a. The series of sight lines 17 are oppositely inclined to said plane to the series of sight lines 17a. The sight lines of each series correspond to the various commonly used cutting angles on the teeth of a chain saw. It will be appreciated that if required any number of sight lines can be incorporated into each series or, in the event that the guide is only intended to be used for one particular cutting angle, there need be only one sight line in each series. These two series of sight lines are provided to enable a file seated in the peripheral grooves of the rollers 13 and 13a to be operated at the correct angle relative to the length of the chain corresponding to the cutting angle of the teeth of the chain.

At the end 11c of the main plate 11 opposite to the arcuate portion 11b is an upstanding flange 20. The flange 20 is at right angles to the plane of the main plate 11 and the upper terminal edge 21 of the flange 20 is inclined outwardly and downwardly towards the main plate 11 in opposite directions from the substantially mid-point 22 of the edge. In the embodiment shown the angle of the edge 21 is 10° from the horizontal which corresponds to the angle of undercut commonly applied to the teeth of some chain saws. The manner in which this inclined edge 21 is used in the guiding of the sharpening operation will be explained hereinafter.

Centrally of the width of the main plate 11 and adjacent the base of the flange 20 there is provided an aperture 25 in the main plate having two opposite edges 26 and 26a inclined at an angle of approximately 30° in opposite directions to the central plane previously referred to in connection with the series of sight lines 17 and 17a. Linear graduations are provided along the edges 26 and 26a, the purpose of which will hereinafter be explained. The graduations are only for comparison purposes and therefore are not required to be in accordance with any recognised measure of length.

The manner in which the saw sharpening guide described above in connection with FIGS. 1 and 2 of the drawings is used, will now be described with reference to FIGS. 3 to 6 of the drawings.

The saw sharpening blade is placed in a straddling position on the chain 31 of the saw with one roller 13 and 13a on either side of the chain and the main plate 11 extending across the chain. As can be seen in FIGS. 3 and 4, respective portions of the underside of the main plate 11 on opposite sides of the slot 16 rest upon the tooth 32 to be sharpened and the depth gauge finger 19 of the same tooth. With the main plate so resting on the top of the tooth, the location of the file seated in the peripheral grooves of the rollers relative to the height of the tooth to be sharpened is set. As the top of the depth gauge 19 is below the level of the cutting edge 33 of the tooth, a flat projecting area of 18 is provided on the underside of the arcuate portion 11b to compensate for the height difference.

The saw sharpening guide is now positioned so that the sight line corresponding to the cutting angle of the tooth to be sharpened is located parallel to the length of the chain, and in the instance shown in FIG. 3 and 30° sight line is so positioned. The file 34 is thus now correctly located at an angle of 30° to the direction of the chain. This being the cutting angle of the teeth of this particular chain.

The guide is lightly but firmly held by the operator in this position so that it rests upon the top of the teeth and the 30° sight line is parallel to the chain. The operator may now reciprocate the file across the cutting edge of the tooth whilst the file is seated in the grooves of the rollers, which rollers rotate as the file moves backwards and forwards. The guide is only held lightly in contact with the tooth of the chain as the guide must move slightly as the file cuts the cutting edge to maintain the file in the pressure contact with the cutting edge to achieve filing thereof. Reciprocation of the file continues until the dullness, has been completely removed from the cuttng edge of the tooth, and the operator then notes which of the graduations on the edge 26 of the opening 25 aligns with the back edge 30 of the tooth being sharpened. Having noted this graduation, all subsequent teeth will be filed until the back edge thereof aligns with the same graduation. This ensures an even pitch is maintained between the teeth.

This operation is repeated for each alternate tooth on the chain, as the cutting edge of adjacent teeth are oppositgly inclined.

After all teeth of the same inclination have been sharpened the saw blade and chain is reversed in vice or other device that is being used to hold it and the guide is then positioned so that the 30° sight line on the opposite series of sight lines is parallel to the length of the chain and the file inserted into the guide from the opposite side. The sharpening operation is then repeated on the remainder of the teeth.

If the teeth of the chain are of the type which have an undercut on the cutting edge then the guide is used as described above with the variation that it is tilted so that one of the portions of the top edge 21 of the flange 20 is horizontal and hence the file is inclined at an angle of 10° to the horizontal. Such a positioning of the guide is shown diagrammatically in FIG. 5 and the sharpening operation is then carried out as previously explained. When the guide is positioned to sharpen the alternate teeth it will be tilted in the opposite direction so that the edge portion 21a is horizontal.

In a chain saw each link forming a tooth has in advance of the cutting edge a depth control finger 31 as illustrated in FIG. 6. As the height of the cutting edge relative to the finger decreasgs each time the tooth is sharpened it is necessary after each sharpening to also correct the height of the depth finger. For this purpose there is inserted into the flange 20 a metal plate 27, offset from the face 20a of the flange, and inclined thereto in the direction of the length of the flange. Two spaced apertures 28 and 29 are provided in the metal plate of a dimension sufficient to permit the depth finger of the tooth to enter each aperture.

As can be seen in FIG. 6, if the guide is presented to a tooth of the chain so that the face 20a rests on the tip of the cutting edge, and the depth finger projects into one of the apertures 28 and 29, a flat file can then be placed on the plate 27 and operated to file away the tip of the depth finger until it is flushed with the plate 27. In this way the operator can readily ensure that the height of the cutting edge above the tip of the depth finger is uniform for all teeth.

In view of the inclination of the plate 27 to the face 20a of the flange, the guide may be used as described above to obtain two different heights of the cutting edge above the depth finger tip. As shown in FIG. 6 with the depth finger entered into aperture 28, the maximum depth of cut per tooth is obtained. If the guide is reversed from the position shown in FIG. 6 so the depth finger enters the aperture 29 as lesser depth of cut per tooth is obtained. Different types of chains may require different depths of cut per tooth, or different depths may be required for different timbers.

Figure 7:
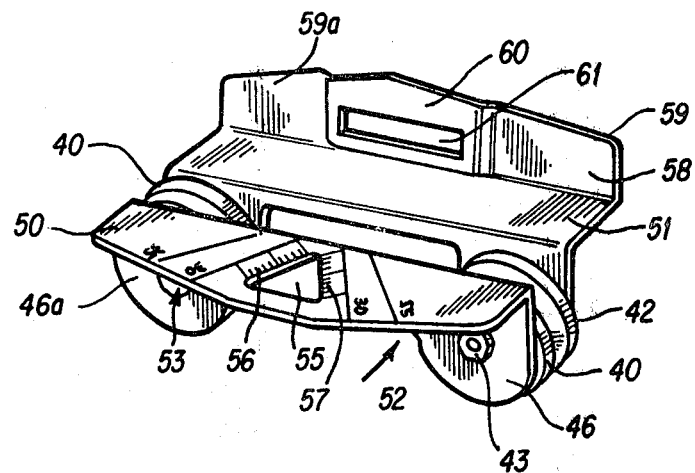
FIG. 7 is a perspective view from above of a second arrangement of the saw sharpening guide.
Figure 8:
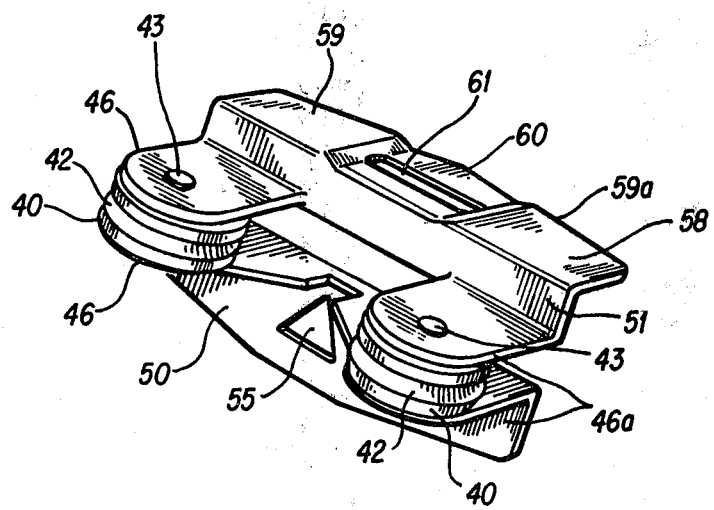
FIG. 8 is a perspective view from beneath, of the saw sharpening guide shown in FIG. 7.

The alternative embodiment of the saw sharpening guide as illustrated in FIGS. 7 and 8 operates in the same basic manner as that previously described in reference to FIGS. 1 and 6, however, the manner of construction of the guide is somewhat changed. The two rollers 40 and 41 are of identical form, each having a peripheral groove 42. The rollers are mounted on respective pins 43 and 44 supported in respective pairs on lugs 46 and 46a. The pins 43 and 44 are arranged with their axes parallel, so that the rollers rotate on parallel axes and the grooves 42 in the respective rollers are arranged in a common plane normal to the axes of the rollers.

One lug of each pair is integral with the first plate section 50 and the other lug of each pair is integral with the second plate section 51. The two plate sections 50 and 51 are parallel to the axes of the rolles with plate section 51 slightly lower than plate section 50 to compensate for the difference in height between the cutting edge and the depth gauge finger 19.

The first plate section 50 is provided with two oppositely inclined groups of sight lines 52 and 53, each comprising two sight lines inclined at 30° and 35° to the plane parallel to and centrally between the roller axes. These sight lines correspond to the groups of sight lines 17 and 17a previously described with respect to FIGS. 1 and 2 and are employed in the same manner as previously described sight lines. The guide is be supported in a straddling relationship on the chain to be sharpened, with one of the sight lines extending parallel to the direction of the chain thus determining the angle at which the file seated in the grooves 42 will sharpen the teeth. When the guide is seated in the straddling relationship on the chain, the underside of the first and second plate sections will rest upon the tooth to be sharpened and the depth gauge finger 19 respectively as described in respect of FIGS. 1 and 2. Thus the depth of the file relative to the cutting edge of the tooth to be sharpened is set. The triangular shaped opening 55 with the opposite graduated edges 56 and 57 performs the same function as the opening 25 and edges 26 and 26a in the previously described embodiment. The graduations 56 and 57 are used in the same manner as previously described so that an equal pitch between the teeth is obtained.

The second plate section 51 has an upturned flange 58 having an upper edge with opposite inclined portions 59 and 59a which are equivalent to the edges 21 and 21a as described in respect of FIGS. 1 and 2. Also the flange 58 has a central offset portion 60 with an elongated aperture 61. The offset portion 60 is inclined to the remainder of the flange 58 as may be best seen in FIG. 8. The offset portion 60 and aperture 61 perform the same function as the metal plate 27 and apertures 28 and 29 in the first embodiment and thus the flange 58 and the offset portion 60 and its aperture 61 can be used as a means of setting the height of the depth gauge finger as described in reference to the first embodiment.

The embodiment shown in FIGS. 7 and 8 is particularly suitable for manufacture from metal as the two basic components, namely the first and second plate sections, with their respect integral lugs and the flange 58 on the second plate section, can be manufactured by simple pressing operations performed on sheet metal.

The above described embodiments may be varied in a number of ways without departing from the present invention. In order to maintain equal pitch between teeth the graduations on the edges of the apertures referred to above may be replaced by or combined with an adjustable stop that will abut the rear end of the tooth being sharpened. Also as an alternative to the sight lines, when the guide is to be used for only one cutting edge angle, projecting lugs may be provided on the underside of the main plate which will abut the chain when the guide is located at the correct inclination. Such lugs will be provided to accommodate the equal and opposite inclinations required for alternate teeth.

The claims of the invention are as follows:
1. A saw sharpening guide comprising:
   a support member adapted to be positioned on a saw blade in a straddling relation thereto with a portion thereof resting on the tips of the teeth of the saw blade;

a pair of rollers each having a continuous peripheral groove and mounted on the support member for rotation on their respective axes in a common plane;

said rollers being arranged so that, when the support member is in its straddling relation, the pair of rollers are located on opposite sides of the saw blade and a file seated in the continuous peripheral grooves of both of the pair of rollers can reciprocate in a line in said common plane and transverse to the saw blade while in rolling contact with the pair of rollers;

a pair of sight lines on the support member oriented at an incline at equal and opposite angles to said common plane and located to be viewed by an operator when the support member is in its straddling relation;

said support member being positionable and manually retainable on the saw blade in its straddling position with either of the pair of sight lines parallel to the saw blade;

said incline of the pair of sight lines being the complement of the cutting angle of the teeth of the saw blade to be sharpened;

said portion of the support member which rests on the tips of the teeth of the saw blade being spaced from the axes of the pair of rollers a distance selected to position the file seated in the continuous peripheral grooves at a predetermined height relative to the teeth of the saw blade to be sharpened; wherein the support member has an edge located to be positioned adjacent to and substantially parallel to the length of a tooth to be sharpened when the guide is in use on the saw blade, and further wherein the support member has linear graduations along said edge.

2. A saw sharpening guide as recited in claim 1 wherein there are a plurality of pairs of sight lines, each pair corresponding to a different tooth cutting angle.

3. A saw sharpening guide as recited in claim 1 wherein the support member includes another portion forming with at least one of the pair of rollers an enclosed passage through which the file extends and may reciprocate when seated in the continuous peripheral groove of each one of the pair of rollers.

4. A saw sharpening guide as recited in claim 1 wherein the support member includes a flange portion projecting at right angles to and transverse to the axes of the pair of rollers and upwardly from the support member when the support member is in its straddling relation to the saw blade, said flange portion terminating in an upper edge transverse to the axes that is outwardly and downwardly inclined at equal and opposite angles from the center of the said edge.

5. A saw sharpening guide as recited in claim 4 wherein said flange portion includes an offset section set off from one face of the flange portion and an aperture in the offset section, whereby with the one face resting on a cutting tooth of a saw blade having a depth gauge finger, the depth gauge finger enters the aperture, the extent of the flange portion to an opposite face of the offset section corresponding to the depth of a cut of the cutting tooth.

6. A saw sharpening guide as recited in claim 5 wherein the offset section is inclined to the one face in the direction of the length of the aperture so the extent of offset at each end of the offset section corresponds to two predetermined depths of the cut of the cutting tooth.

7. A saw sharpening guide as recited in claim 1 wherein the support member includes a flange portion projecting upwardly from the plane of the support member and transverse to the axes of the pair of rollers, said flange portion includes an offset section set off from one face of the flange portion and an aperture in the offset section, whereby with the one face resting on a cutting tooth of a saw blade having a depth gauge finger, the depth gauge finger enters the aperture, the extent of offset measured from the one face of the flange portion to the opposite face of the offset section corresponding to the depth of a cut of the cutting tooth.

* * * * *